J. IRVINE.
WHIFFLETREE IRON.
No. 188,912.  Patented March 27, 1877.
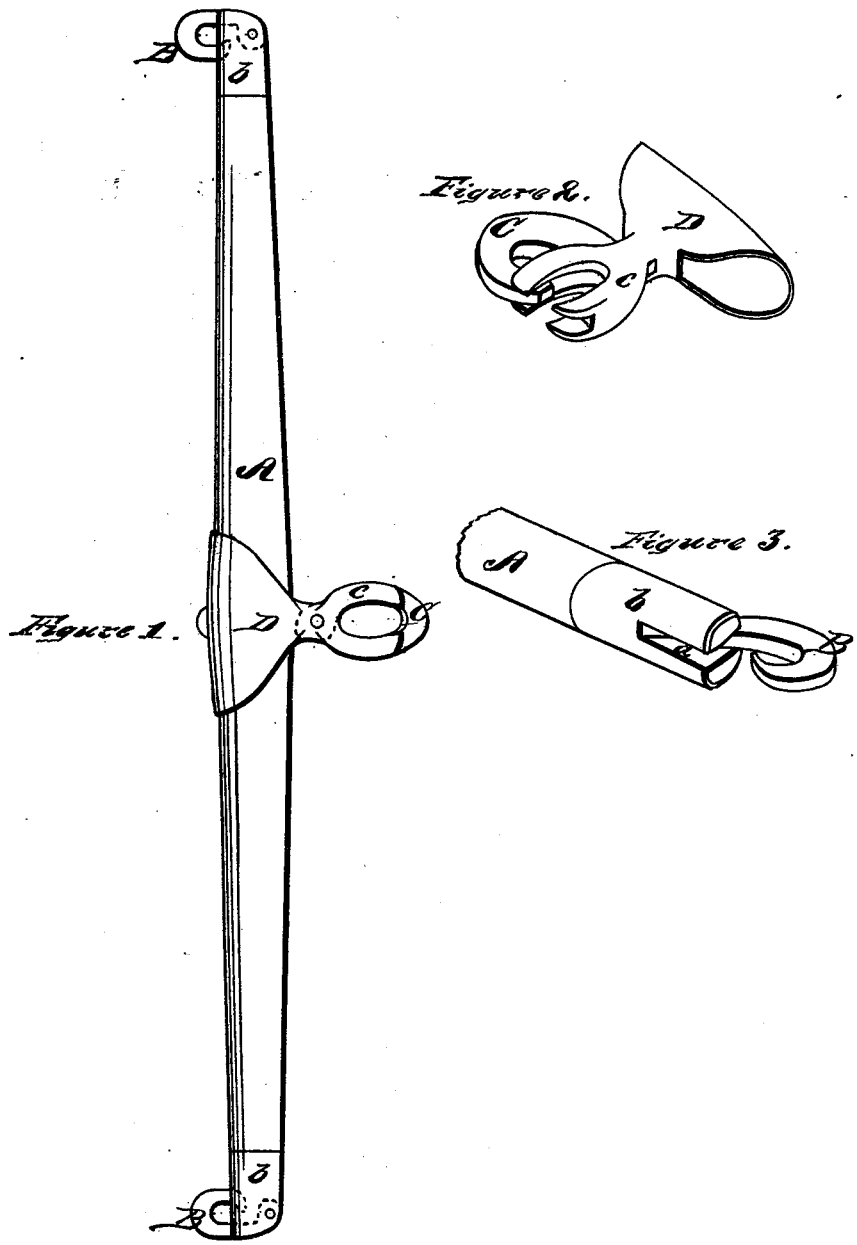

UNITED STATES PATENT OFFICE.

JOHN IRVINE, OF ICKESBURG, PENNSYLVANIA.

IMPROVEMENT IN WHIFFLETREE-IRONS.

Specification forming part of Letters Patent No. 188,912, dated March 27, 1877; application filed December 2, 1876.

*To all whom it may concern:*

Be it known that I, JOHN IRVINE, of Ickesburg, in the county of Perry and State of Pennsylvania, have invented a new and valuable Improvement in Ironing Single-Trees; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my single-tree irons, and Fig. 2 a perspective view of the rear hook and ferrule. Fig. 3 is a perspective view of the end hook and ferrule of my single-tree irons.

This invention has relation to carriage or wagon single-trees; and the novelty consists in the construction of the central hook, as will be hereinafter more fully described and explained.

In the drawings, the letter A designates an ordinary single-tree, B the end hooks, and C the center or rear hook. The ends of the single-tree are slotted, as shown at $a$, and provided with ferrules $b$, also slotted, to correspond with the ends of the single-tree. The end hooks B are hinged in the ferrules $b$ in slots $a$ so as to shut or close into said slot toward the front of the single-tree.

D represents the center ferrule, passing entirely around the single-tree, from which extends rearward the U-shaped iron $c$, with slotted arms, at butt of which is hinged the rear hook C, conforming in size and shape to said arms.

It will be seen that with this device the end hooks can easily be thrown back and the traces released therefrom or placed therein with great facility when the horses are at rest, and that any strain upon the traces will securely close said hooks.

The center ferrule, being of considerable length and extending entirely around the single-tree, will add strength to the latter and prevent its splitting by reason of any strain exerted thereon. These irons are preferably made of malleable cast-iron.

What I claim as new, and desire to secure by Letters Patent, is—

The hook C, hinged in and closing into arms $c$ of ferrule D, and forming therewith a single link, substantially as specified.

In testimony that I claim the above I have hereunto subscribed my name in the presence of two witnesses.

JOHN IRVINE.

Witnesses:
 JACOB A. RICE,
 LEVI WEIBLEY.